United States Patent
Villareal et al.

(10) Patent No.: US 10,815,412 B2
(45) Date of Patent: Oct. 27, 2020

(54) HYDROCARBON-FREE EMULSIFIER

(71) Applicant: Lamberti SPA, Albizzate (IT)

(72) Inventors: Christopher Quenton Villareal, Rosenberg, TX (US); Andrea Balestrini, Sugar Land, TX (US); Sama Nazar Makiah, Richmond, TX (US); Bruno Pegorari, Americana (BR); Giovanni Floridi, Novara (IT); Giuseppe Li Bassi, Gavirate (IT)

(73) Assignee: Lamberti SPA, Albizzate (IT)

(*) Notice: Subject to any disclaimer, the term of this patent is extended or adjusted under 35 U.S.C. 154(b) by 294 days.

(21) Appl. No.: 15/764,571

(22) PCT Filed: Sep. 29, 2016

(86) PCT No.: PCT/EP2016/073358
§ 371 (c)(1),
(2) Date: Mar. 29, 2018

(87) PCT Pub. No.: WO2017/055508
PCT Pub. Date: Apr. 6, 2017

(65) Prior Publication Data
US 2018/0282607 A1 Oct. 4, 2018

(30) Foreign Application Priority Data

Sep. 30, 2015 (IT) .............................. UB2015A3988

(51) Int. Cl.
| | | |
|---|---|---|
| C09K 8/36 | (2006.01) | |
| B01F 17/00 | (2006.01) | |
| C09K 8/565 | (2006.01) | |
| C09K 8/64 | (2006.01) | |
| C09K 8/82 | (2006.01) | |
| C09K 8/502 | (2006.01) | |
| C09K 8/42 | (2006.01) | |

(52) U.S. Cl.
CPC ............ *C09K 8/36* (2013.01); *B01F 17/0085* (2013.01); *C09K 8/42* (2013.01); *C09K 8/502* (2013.01); *C09K 8/565* (2013.01); *C09K 8/64* (2013.01); *C09K 8/82* (2013.01)

(58) Field of Classification Search
None
See application file for complete search history.

(56) References Cited

U.S. PATENT DOCUMENTS

| | | | |
|---|---|---|---|
| 4,658,036 A | 4/1987 | Schilling | |
| 2003/0144153 A1 | 7/2003 | Kirsner | |
| 2005/0049147 A1 | 3/2005 | Patel | |
| 2008/0135302 A1* | 6/2008 | Zhang | C09K 8/06 175/70 |
| 2008/0179570 A1 | 7/2008 | Hurd | |
| 2012/0202717 A1* | 8/2012 | Bustos | C09K 8/502 507/112 |
| 2013/0000900 A1 | 1/2013 | Kalgaonkar | |
| 2013/0331303 A1* | 12/2013 | Rife | C09K 8/36 507/131 |
| 2014/0121135 A1 | 5/2014 | Gamage | |
| 2016/0152885 A1* | 6/2016 | Offenbacher | C09K 8/26 166/304 |

FOREIGN PATENT DOCUMENTS

JP 2011245470 A 12/2011

OTHER PUBLICATIONS

International Search Report for PCT/EP2016/073358 dated Dec. 2, 2016.

\* cited by examiner

*Primary Examiner* — John J Figueroa
(74) *Attorney, Agent, or Firm* — Iona Niven Kaiser; Vorys, Sater, Seymour and Pease LLP

(57) ABSTRACT

The present invention relates to a hydrocarbon-free emulsion stabilizer, to water-in-oil subterranean treatment fluids comprising said stabilizer and having improved stability and environmental compatibility, and to their use in subterranean treatments.

10 Claims, No Drawings

HYDROCARBON-FREE EMULSIFIER

FIELD OF THE INVENTION

The present invention relates to a hydrocarbon-free emulsion stabilizer, to water-in-oil subterranean treatment fluids, having improved stability and environmental compatibility, comprising said stabilizer, and to their use in subterranean treatments.

Subterranean treatments fluids are meant to include drilling and completion fluids; as well as those fluids used in subterranean operations such as stimulation, etc.

STATE OF THE ART

Various types of subterranean treatment fluids, such as drilling fluids, are used in operations related to the development, completion, and production of natural hydrocarbon reservoirs.

These fluids may be classified according to their fluid base. Water base fluids contain solid particles suspended in water or brine. Alternatively, oil based fluids contain solid particles suspended in an oil continuous phase or, possibly, in water or brine emulsified within an oil (water-in-oil emulsions).

Water-in-oil emulsions have the oil phase as the continuous phase and a fluid at least partially immiscible in the oil phase (usually an aqueous-based fluid) as the discontinuous phase.

Water-in-oil emulsions may be also referred to as invert emulsions. Invert emulsions are preferred as drilling fluids when the formation is remarkably sensitive to contact with water and they have usually a better thermal resistance and guarantee better lubrication of the drill strings and downhole tools, thinner filter cake formation and improved hole stability.

Emulsions are generally stabilized by addition of one or more emulsion stabilizing agents, also referred to as emulsifiers, which prevent the droplets coalescence, phase separations and the reduction of their performances.

When used in subterranean applications, emulsions undergo exceptional mechanical and thermal stress, and therefore stability is an especially critical aspect of their formulation.

The emulsifiers that are traditionally used in subterranean treatment fluids have surfactant-character, comprising a hydrophobic portion and a hydrophilic portion.

Examples of these emulsifiers are: calcium, magnesium and aluminium soaps of rosin acids and fatty acids, fatty acids, oxidized fatty acids, maleated fatty acids, fatty amines and fatty (poly)amides.

Fatty polyamides that are obtained from the condensation of fatty acids/carboxylic acids with polyamines show remarkable emulsifying and dispersing properties and are really useful in various applications where invert emulsions are formed.

For example, U.S. Pat. No. 2,946,746 describes water-in-oil type emulsions comprising a polyamide emulsifying agent which may be prepared by reacting a polyethylene polyamine with a monobasic fatty acid in sufficient quantity to react with all of the amino groups of the polyethylene polyamine, thereby converting them to fatty acid amide groups.

U.S. Pat. No. 4,658,036 discloses a process for preparation of invert emulsifiers useful for oil-base drilling muds. The emulsifiers are prepared by reacting tall oil fatty acids with acrylic acid, maleic anhydride or fumaric acid. The product of this reaction is reacted with diethylene triamine and at least one tall oil fatty acid to give the invert emulsifier.

WO 89/11516 relates to an oil-based well-working fluid comprising: a) an emulsifier comprising the reaction product of i) one or two moles of an amide-amine or a hydroxyalkyl amide; with ii) one to five moles of a dicarboxylic acid or an acid anhydride; b) a hydrocarbon drilling oil; and c) a sodium, calcium or magnesium brine.

US 2003/162668 describes a method and a product which provides emulsion stability and filtration control to invert emulsion drilling fluids. The product comprises a blend of a carboxylic acid terminated polyamide and a mixture produced by the Diels-Alder reaction of dienophiles.

US 2011/0306523 relates to emulsifiers for oil-based drilling fluids based on the polyamides derived from fatty acids/carboxylic acids and optionally alkoxylated polyamines.

US 2014/121135 disclose an invert emulsion comprising an aqueous fluid, an oleaginous fluid, and an emulsifier composition, wherein the emulsifier composition comprises: from 25 to 100 wt % of an emulsifier, which can comprise a carboxylic acid-terminated polyamide. This may be a product of a condensation reaction between a fatty acid, a polyamine and an acid anhydride or a polycarboxylic acid.

Other examples of performing emulsifiers are fatty alkanolamides, which are obtained by reaction of fatty acids with an alkanol amine, such as diethanol amine or monoethanol amine.

Unfortunately, many of these emulsifiers are very high viscosity liquids, almost solid, especially under low temperature conditions, so they must be diluted with an appropriate solvent to be manageable. Usually, this solvent includes hydrocarbons, such as mineral oil, diesel oil, crude oil, kerosene and the like.

However, the hydrocarbons have become increasingly subjected to evaluation for compliance with various health, safety, and environmental guidelines and their use widely restricted. For example, diesel oil has a high content of aromatic hydrocarbons, which are not environmentally friendly, and thus cannot be used off-shore or in regions with strict environmental regulations. Moreover, diesel oil has also a low flash point, making it more difficult for transportation. To try to avoid this problem, synthetic hydrocarbon fluids or low BTEX mineral oils are utilized, but these also have drawbacks of low flash points and/or are significantly more expensive than diesel. Hydrocarbon solvents also tend to be more expensive than many of the active components, thus increasing the cost significantly of the finished product.

In order to avoid these problems, emulsifiers in the form of powder have been developed. For example, US 2007/167333 describes a spray dried emulsifier comprising a carboxylic acid terminated fatty amide which is prepared by reacting a fatty acid amine condensate with a polycarboxylic acid or a carboxylic acid anhydride.

However, dry emulsifiers present several issues: it can be difficult to disperse/solubilize these solid emulsifiers efficiently and quickly into the oil phase and/or the aqueous phase of the invert subterranean treatment fluids, which usually contain high amounts of undissolved solids; limited chemistries are available in powder form; with time the solid emulsifiers can harden and moisture content can notably increase; there could be potential hazards due to volatile dust; and generally speaking these solid emulsifiers are more expensive than liquid products There is still a need in the oil field industry, for products, such as the emulsion stabilizing agents, that have a favourable balance between performances, costs and toxicological and ecological profile.

It has now surprisingly been found that compositions of fatty polyamides and/or fatty alkanolamides with fatty acids and/or fatty acid derivatives can be dissolved at high concentration in a mixture of water and one or more mutual solvent without the addition of any hydrocarbon solvent (hydrocarbon-free).

The emulsion stabilizing agents so obtained show excellent properties as emulsifier when they are used in invert subterranean treatment fluids, being able to guarantee optimal stability of the fluids in the presence of solid components/contaminants and even at the high temperatures which can be found in the subterranean treatments, for examples in oil well drilling.

In addition, these emulsion stabilizing agents show a long term stability and are pourable, even in a low temperature environment, and can be easily manipulated and transported.

With the expression "mutual solvent" we mean a solvent having a polar, water-soluble group attached to a nonpolar hydrocarbon chain, which is water-insoluble and soluble in apolar solvents. Mutual solvents are additives used in oil field and well applications that are soluble in oil, water and acid-based treatment fluids, wherein they are routinely used for removing heavy hydrocarbon deposits, controlling the wettability of contact surfaces before, during or after a treatment, and preventing or breaking emulsions. In some embodiment, the mutual solvent may be substantially completely soluble in each phase, while in other embodiments, a low degree of solubilization may be preferable.

DESCRIPTION OF THE INVENTION

It is, therefore, an object of the present invention a hydrocarbon-free emulsion stabilizing agent comprising:
  a) from 20 to 65% by weight, preferably from 35 to 55% by weight, of a fatty polyamide and/or a fatty alkanolamide;
  b) from 5 to 40% by weight, preferably from 10 to 25% by weight, of another emulsifier selected among fatty acids, oxidized fatty acids, maleated fatty acids, polymerized fatty acids and mixtures thereof;
  c) from 5 to 35% by weight of water;
  d) from 0 to 25% by weight, preferably from 10 to 25% by weight, of a mutual solvent;
with the proviso that the pH of emulsion stabilizing agent is comprised between 8 and 12, preferably between 8 and 9.5.

Further according to the invention, there is provided a water-in-oil subterranean treatment fluid comprising: an oil phase, an aqueous phase and said hydrocarbon-free emulsion stabilizing agent.

In a further embodiment, the present invention provides a method of treating a subterranean formation that comprises: providing a water-in-oil subterranean treatment fluid containing an oil phase, an aqueous phase and said hydrocarbon-free emulsion stabilizing agent and placing this fluid into the subterranean formation at a pressure to treat the formation.

The features and advantages of the present invention will be readily apparent to those skilled in the art upon reading of the description of the preferred embodiments which follows.

DETAILED DESCRIPTION OF THE INVENTION

The emulsion stabilizing agent of the invention does not contain any hydrocarbon solvent.

The fatty polyamide is the preferred component a) of the emulsion stabilizing agent of the invention.

Any fatty polyamide emulsifier known in the art can be used for the realization of the present invention. Suitable examples are the polyamides disclosed in the patents reported above.

In a preferred embodiment of the invention the fatty polyamide is prepared by reaction of:
  i) one mole of polyamine having n amino groups with exchangeable hydrogens, wherein n is an integer ranging from 2 to 6;
  ii) from 1 to n-1 moles of a saturated or unsaturated $C_6$-$C_{30}$ aliphatic monocarboxylic acid;
and, subsequently, reacting the remaining amino groups with exchangeable hydrogens of the partial amide so obtained with:
  iii) at least 0.3 moles of a $C_2$-$C_{10}$ di- and/or tri-carboxylic acid or the corresponding anhydride.

In a preferred embodiment of the invention n is 3 or 4. More preferably n is 3.

Suitable polyamines that may be used for the preparation of the polyamides of the invention include, for example, polyalkylene polyamines.

The polyalkylene polyamines that may be employed as a starting material include compounds having the formula I:

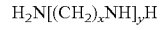

$$H_2N[(CH_2)_xNH]_yH \qquad \mathrm{I}$$

where x is an integer ranging from 1 to 6, preferably 2 and 3, and y is an integer ranging from 1 to 5.

Examples of suitable polyalkylene polyamines are those, wherein x in the formula above is 2, such as ethylene diamine, diethylene triamine triethylene tetramine,tetraethylene pentamine and mixture thereof.

Other examples of suitable polyamines are polyethyleneimines with a average molecular weight of below about 300 dalton, which exhibit a low degree of branching.

Preferably, the polyamine is chosen among diethylene triamine, triethylene tetramine and mixture thereof.

Examples of $C_6$-$C_{30}$ aliphatic unsaturated monocarboxylic acids suitable for the present invention include both unsaturated and polyunsaturated aliphatic carboxylic acids with from 6 to 30 carbon atoms. Examples of these acids are palmitoleic acid, oleic acid, linoleic acid, linolenic acid, arachidonic acid, and the like.

Examples of $C_6$-$C_{30}$ aliphatic saturated monocarboxylic acids include decanoic acid, lauric acid, myristic acid, palmitic acid, stearic acid, behenic acid, and the like.

Mixtures of $C_6$-$C_{30}$ saturated and unsaturated aliphatic monocarboxylic acids can be also used.

Mixtures of monocarboxylic acids derived from natural oils, such as coconut oil, mustard seed oil, palm oil, olein, soy oil, canola oil, tall oil, sunflower oil, and mixture thereof, are particularly preferred.

Mixtures of saturated and unsaturated aliphatic $C_6$-$C_{30}$ monocarboxylic acids obtained as by-product in the process of the biodiesel production are also suitable.

In one embodiment of the invention the $C_6$-$C_{30}$ monocarboxylic acid ii) is a mixture of $C_6$-$C_{30}$ saturated and unsaturated aliphatic monocarboxylic acids comprising at least 40% by weight, preferably at least 60% by weight, of oleic acid.

Preferably, the monocarboxylic acid source is selected from tall oil, rape seed oil, mustard seed oil, by-products in the process of the biodiesel production and mixtures thereof.

Tall oil and by-products in the process of the biodiesel production are particularly preferred as source $C_6$-$C_{30}$ aliphatic saturated and unsaturated monocarboxylic acids for use in the process for making the fatty polyamide of the present invention.

The preparation of the partial amide may be carried out according to methods well known to those skilled in the art, by heating the polyamine i) and the monocarboxylic acid ii) up to 250° C., preferably from 140 to 180° C., either or not, in a suitable hydrocarbon solvent such as toluene or xylene and azeotroping off the formed water, with or without catalysts such as p-toluenesulphonic acid, zinc acetate, zirconium naphthenate or tetrabutyl titanate. Usually, the endpoint of the reaction is considered to be reached when the acid number of the reaction mixture, determined by ASTM standard method D1980-87, is below 30 $mg_{KOH}$/g, preferably below 10 $mg_{KOH}$/g.

When the polyamine used is diethylene triamine, preferably, in the first step one mole of diethylene triamine is reacted with from 1.5 to 2.0 moles of acid.

In one of the preferred embodiments of the invention, the polyamine is reacted with about n-1 moles of a saturated or unsaturated $C_6$-$C_{30}$ aliphatic monocarboxylic acid.

The di- or tri-carboxylic acid or the corresponding anhydride, that can be reacted with the above-described partial amides to form the fatty polyamide of the present invention, has preferably from 3 to 8 carbon atoms.

Examples of suitable $C_2$-$C_{10}$ di- or tri-carboxylic acids include succinic acid, malonic acid, (ethylenedioxy) diacetic acid, maleic acid, diglycolic acid, tartaric acid, tartronic acid and fumaric acid; citric acid, aconitic acid, citraconic acid, carboxymethyloxysuccinic acid and lactoxysuccinic acid; phthalic acid; and mixtures thereof.

Preferably, the $C_2$-$C_{10}$ di- or tri-carboxylic acid is fumaric acid, malonic acid, maleic acid or citric acid; or mixtures thereof.

The remaining amino groups with exchangeable hydrogens of the partial amide and the di- and/or tri-carboxylic acid (or corresponding anhydride) described above can be condensed at a temperature ranging from about 120° C. to about 250° C., preferably from about 140° C. to about 200° C., while the formed water is distilled off. The end-point of the reaction is considered to be reached when the total amine value of the reaction mixture, determined by ASTM standard method D2074-12, is below 60 $mg_{KOH}$/g, preferably below 40 $mg_{KOH}$/g, more preferably below 20 $mg_{KOH}$/g.

Preferably, the acid number of the fatty polyamide so obtained, determined by ASTM standard method D1980-87, is below 70 $mg_{KOH}$/g, more preferably it is comprised between 20 and 80 $mg_{KOH}$/g.

In another preferred embodiment of the invention, the remaining amino groups with exchangeable hydrogens are reacted with from 0.4 to 1 moles, preferably from 0.4 to 0.7, of $C_2$-$C_{10}$ dicarboxylic acid for each remaining amino group.

The fatty alkanolamides useful for the realization of the present invention include the reaction products of one or more saturated or unsaturated $C_6$-$C_{30}$ aliphatic monocarboxylic acid with from one or more mono- and di-alkanol amines having $C_1$-$C_8$ alkanol radicals.

Examples of suitable saturated or unsaturated $C_6$-$C_{30}$ aliphatic monocarboxylic acids are those described above.

Exemplary mono- and di-alkanol amines are methanol amine, dimethanol amine, monoethanol amine, diethanol amine, n-propanol amine, di-n-propanol amine, isopropanol amine, n-butanol-amine, isobutanol amine, with monoethanol amine and diethanol amine being preferred.

Beside the fatty polyamide and/or the fatty alkanolamide, the emulsion stabilizing agent of the invention also comprises another emulsifier chosen among fatty acids, oxidized fatty acids, maleated fatty acids, polymerized fatty acids and mixture thereof.

Suitable examples of fatty acids are the monocarboxylic acids described above for the preparation of the polyamides. Aliphatic saturated and unsaturated monocarboxylic acids derived from tall oil and from the biodiesel production are particularly preferred.

Any oxidized or maleated fatty acid commonly used in the field can be utilized for the realization of the present invention.

Oxidized fatty acids are commonly prepared by passing (blowing) air, oxygen, ozonized air or ozone through the material, such as tall oil fatty acids or linseed oil fatty acids, under mildly elevated temperatures. This process forms ketones from hydroxy groups and hydroxy groups at unsaturation sites.

Maleated fatty acids are readily prepared by methods well known in the art, which generally consist of heating approximately equivalent proportions of fatty acids and maleic anhydride at temperatures ranging from about 100 to 220° C. for periods ranging from several minutes up to several hours.

The polymerized fatty acids useful for the realization of the present invention may contain twenty-four or more carbon atoms and two or more carboxyl groups. Satisfactory acids of this type include the dimer and trimer fatty acids produced by polymerization (condensation) of unsaturated fatty acids according to one of the various procedures described in the art. Usually, dimer and trimer fatty acids contain predominantly monocyclic addition compounds of unsaturated fatty acids (obtained for example from tall oil or soybean oil) containing respectively 36 and 54 carbon atoms. Commercial polymerized fatty acids are usually mixtures which may contain extremely varying amounts of monomeric by-products, starting materials, as well higher polymeric acids along with dimer and trimer acids fatty acids. If desired, a specific component of such mixtures, i.e. dimer fatty acids, may be separated, for example by distillation. The preferred polymerized fatty acids are mixture of dimer and trimer fatty acids, preferably comprising between 30 and 90% by weight of dimer fatty acids and between 10 and 70% by weight of trimer fatty acids.

Preferably, the component b) of the emulsion stabilizing agent is chosen among fatty acids, in particular among mixtures of fatty acids comprising at least 40% by weight, preferably at least 60% by weight, of oleic acid.

Illustrative examples of mutual solvents include $C_1$-$C_6$ alcohols, linear or branched such as 2-propanol, methanol, n-butanol; glycols and polyglycols, such as monoethylene glycol, monopropylene glycol, diethylene glycol, dipropylene glycol, triethylene glycol, tripropylene glycol, and higher; glycol ethers such as 2-methoxyethanol, 2-propoxyethanol, 2-ethoxyethanol, ethylene glycol monobutyl ether, propylene glycol monobutyl ether, diethyleneglycol monomethyl ether dipropylene glycol monomethyl ether, diethylene glycol monoethyl ether, dipropylene glycol monoethyl ether, diethylene glycol monobutyl ether, dipropylene glycol monobutyl ether, triethylene glycol monoethyl ether, triethylene glycol monobutyl ether, tripropylene glycol monobutyl ether, and the like; various esters, such as ethyl lactate, propylene carbonate, butylene carbonate, water/oil-soluble ketones, acetals, ketals, pyrrolidones, and mixtures thereof The mutual solvent is preferably selected from the group which consists of $C_1$-$C_6$ alcohols, glycols, polyglycols, glycol ethers and mixtures thereof. Most preferred mutual solvents are polyglycols, glycols ethers and mixtures thereof.

Particularly suitable for the realization of the present inventions are polyglycol and glycol ether bottoms, which are mixtures of polyglycols and glycol ethers obtained as by-product or co-product of the production processes of polyglycols and glycol ethers. Specific examples polyglycols and glycol ether bottoms are tripropylene glycol bottoms, which are mixtures of di-, tri-, tetra- and higher propylene glycols, triethylene glycol monomethyl ether bottoms, which are mixtures of di-, tri-, tetra- and higher ethylene glycols methyl ethers, and triethylene glycol monoethyl ether bottoms, which are mixtures of di-, tri-, tetra- and higher ethylene glycols ethyl ether.

The emulsion stabilizing agent of the invention can be simply prepared by mixing the various emulsifiers, which include the fatty polyamides, fatty alkanolamides, and fatty acids (including oxidized, maleated and polymerized fatty acids), at a temperature between 35 and 150° C., preferably between 65 and 100° C., until homogeneous. Subsequently, this mixture can be diluted with the mutual solvent and homogenized. Then, the pH of the mixture is corrected to a value comprised between 8 and 12 with a base. Preferably the base comprises a monovalent cation such as ammonium, tetra-C1-C4-alkyl ammonium or an alkali metal. Specific examples are sodium hydroxide, potassium hydroxide and ammonium hydroxide, sodium and potassium bicarbonate, sodium and potassium carbonate, and the like. Sodium hydroxide and potassium hydroxide are preferred. At a temperature between 65 and 95° C., the solution so obtained is further diluted with water, maintaining a temperature below 100° C. so as to not boil off the water. After mixing, a homogeneous emulsion stabilizing agent is obtained.

The water-in-oil subterranean treatment fluid of the present invention comprises an oil phase, an aqueous phase (a water based fluid that is at least partially immiscible with the oil phase), and from 0.5 to 5.0% weight/volume, preferably from 1.0 to 4.0% weight/volume, of the emulsion stabilizing agent.

According to an advantageous embodiment of the present invention, the water-in-oil fluids do not comprise any additional emulsifier, except the emulsion stabilizing agent.

The concentration of the oil phase in the water-in-oil fluid should be sufficient so to form an invert emulsion and may be less than about 90 percent in volume of the invert emulsion (vol. %).

In an embodiment, the amount of oil phase is from about 20 to about 85 vol. %, preferably from about 50 to about 85 vol. % based on the total volume of fluid the invert emulsion.

In another embodiment, inverse high internal phase ratio emulsions, i.e. systems possessing a larger volume of internal aqueous phase (>50% in volume), are preferred because of the significant reduction of the oil phase, with its associated costs and possible environmental concern for possible contamination and waste disposal.

The oil phase used in the invert emulsions of the present invention may comprise any oil-based fluid suitable for use in emulsions.

The oil phase may derive from a natural or synthetic source. Examples of suitable oil phase include, without limitation, diesel oils, paraffin oils, mineral oils, low toxicity mineral oils, olefins, esters, amides, amines, synthetic oils such as polyolefins, ethers, acetals, dialkylcarbonates, hydrocarbons and combinations thereof.

The preferred oil phases are paraffin oils, low toxicity mineral oils, diesel oils, mineral oils, polyolefins, olefins and mixtures thereof.

Factors determining which oil phase will be used in a particular application, include but are not limited to, its cost and performance characteristics, environmental compatibility, toxicological profile and availability.

The invert emulsions of the present invention also comprise an aqueous phase that is at least partially immiscible in the oil phase.

Suitable examples of aqueous phase include fresh water, sea water, salt water, and brines (e.g., saturated salt waters), glycerine, glycols, polyglycol amines, polyols and derivatives thereof, that are partially immiscible in the oleaginous fluid, and combinations thereof.

Suitable brines may include heavy brines.

Heavy brines, for the purposes of this application, include brines with various salts at variable concentrations, that may be used to weight up a fluid; generally of the use of weighting agents is required to provide the desired density of the fluid.

Brines generally comprise water soluble salts.

Suitable water soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and mixtures thereof.

The aqueous phase is chosen taking into account several factors including cost, environmental and health safety profile, density, availability, and which oil phase has been chosen. Another factor that may be considered is the application of the subterranean treatment fluid.

For example, if the application needs an emulsion with a heavy weight, a zinc bromide brine may be chosen.

The subterranean treatment fluids of the invention may further comprise conventional additives including weighting agents, wetting agents, fluid loss agents, thickeners, thinning agents, lubricants, anti-oxidants, corrosion inhibitors, scale inhibitors, defoamers, biocides, pH modifiers, and the like. Such fluids, in particular, also contain at least one filtrate reducer preferably chosen among gilsonite, organophilic lignite, organophilic tannins, synthetic polymers, polycarboxylic fatty acids and mixtures thereof.

When used in certain applications, the fluids may include particulates such as proppant or gravel.

The water-in-oil subterranean treatment fluids of the invention may be suitable for use in a variety of subterranean applications wherein water-in-oil emulsions are used; these applications include drilling, completion, stimulation operations (such as fracturing) and work-over, sand control treatments such as installing a gravel pack, spotting, cementing, maintenance and reactivation.

To better illustrate the invention, the following examples are reported to show the effect of the addition of emulsion stabilizing agent of the invention in exemplary water-in-oil drilling fluids.

EXAMPLES

Characterization Methods

The acid number was determined following the ASTM standard method ASTM-D1980-87.

The total amine value was determined following the ASTM standard method D2074-12.

The Brookfield RV® viscosity was determined at 25° C. and 30 rpm using a Brookfield RV® viscosimeter.

The pour point was determined according to the ASTM standard method D97-12.

The drilling muds were evaluated according to the ISO standard method 10416-08, chapter 26.

Ingredients

In the Examples the following ingredients were used:

Tall Oil Fatty Acids (TOFA)
Diethylene Triamine (DETA)
Maleic Anhydride (MA)
Fatty Acids Mixture from bio-diesel production (FA)
Triethylene Glycol Monobutyl Ether (BTG)
Monoethylene Glycol (MEG)
Diethylene Glycol (DEG)
Escaid 117, mineral oil commercialized by ExxonMobil Chemical
Maleated Tall Oil Fatty Acids (MTO)
Acetone Glycerol (AGK)
Ethylene Glycol Monobutyl Ether (Glycol Ether EB)
Diethylene Glycol Monobutyl Ether (Glycol Ether DB)
Dipropylene Glycol Monomethyl Ether (DPM)
Mix of triethylene glycol monobutyl ether and diethylene glycol monobutyl ether (TBH)
Tripropylene Glycol Bottoms (TPG-Bottoms)
Triethylene Glycol Monobutyl Ether Bottoms (BTG-Bottoms)
Methanol (MeOH)
Distilled Tall Oil Fatty Acids (CTO-D)
Fatty Alkanolamide obtained from Tall Oil and Diethanol Amine (FAA)
Triethylene Glycol Monomethyl Ether Bottoms (MxMG)
Triethylene Glycol Monoethyl Ether Bottoms (MxEG)
NaOH 50% wt (NaOH)
KOH 50% wt (KOH)

Polyamide Preparation

Polyamide 1

448.7 g of tall oil fatty acids (TOFA) were loaded in a 1000 ml glass reactor equipped with a Dean-Stark apparatus and a mechanical blade stirrer and heated to about 95° C. Then 80.8 g of DETA were added. The reaction mixture was further heated to 160° C. under nitrogen atmosphere and maintained at this temperature for 6 hours. At the end of the reaction, 27.6 g of water were recovered and the intermediate product had an acid number lower than 10 $mg_{KOH}/g$. Subsequently, the mass was cooled to about 82° C. and 38.45 g of MA were slowly added. The reaction temperature was increased to 150° C. for 60 minutes and about 7.08 grams of water was removed. The final product had a total amine content below 20 $mg_{KOH}/g$ and and an acid number of about 35 $mg_{KoH}/g$ and was solid at room temperature.

Examples 1-30

The emulsion stabilizing agents of Example 1-30 were prepared by mixing in different ratios the polyamide 1 with the fatty acids and the fatty acid derivatives. The mixtures were then diluted with a mutual solvent and homogenized. Subsequently, the pH was brought to a value around 9 with NOH or KOH and the obtained solutions were diluted with water.

Tables 1-4 report the amount of ingredients for each Example in % by weight.

TABLE 1

| | Ex.1 | Ex.2 | Ex.3 | Ex.4* | Ex.5 | Ex.6 | Ex.7 | Ex.8 |
|---|---|---|---|---|---|---|---|---|
| Polyamide 1 | 55 | 55 | 55 | 55 | 55 | 55 | 55 | 55 |
| FA | 10 | 10 | 10 | 10 | 10 | 10 | 10 | 10 |
| BTG | 20 | | | | | | | |
| MEG | | 20 | | | | | | |
| DEG | | | 20 | | | | | |
| Escaid 117 | | | | 20 | | | | |
| Glycol Ether EB | | | | | 20 | | | |
| Glycol Ether DB | | | | | | 20 | | |
| DPM | | | | | | | 20 | |
| AGK | | | | | | | | 20 |
| NaOH | 4 | 4 | 4 | 4 | 4 | 4 | 4 | 4 |
| KOH | | | | | | | | |
| Water | 11 | 11 | 11 | 11 | 11 | 11 | 11 | 11 |
| Soluble | Yes | Yes | Yes | No | Yes | Yes | Yes | Yes |
| Viscosity mPa · s | 1300 | ND | ND | ND | 188 | 240 | 1350 | 2225 |
| Pour Point ° C. | −5 | ND | ND | ND | −18 | −18 | −10 | 3 |

*Comparative
ND = Not Determined

TABLE 2

| | Ex.9 | Ex.10 | Ex.11 | Ex.12 | Ex.13 | Ex.14 | Ex.15 | Ex.16 | Ex.17 |
|---|---|---|---|---|---|---|---|---|---|
| Polyamide 1 | 55 | 55 | 55 | 60 | 35 | 45 | 32 | 32 | 32 |
| FA | 10 | 10 | 10 | 5 | 30 | 20 | 18 | 18 | 18 |
| MTO | | | | | | | 22 | 22 | 22 |
| BTG | | | 20 | | | | | | |
| TBH | | | | 20 | 20 | | 16 | 20 | |
| BTG Bottoms | | | | | | 21 | | | |
| TPG Bottoms | 20 | | | | | | | | |
| MeOH | | 20 | | | | | | | |
| NaOH | 4 | 4 | | 4 | 4 | 4 | 4 | 4 | 6 |
| KOH | | | 4 | | | | | | |
| Water | 11 | 11 | 11 | 11 | 11 | 10 | 8 | 4 | 22 |
| Soluble | Yes | Yes | Yes | Yes | Yes | Yes | Yes | Yes | Yes |
| Viscosity mPa · s | ND | ND | 1580 | ND | ND | 650 | 1220 | ND | ND |
| Pour Point ° C. | ND | ND | 8 | ND | ND | −14 | −9 | ND | ND |

ND = Not Determined

TABLE 3

|  | Ex.18 | Ex.19 | Ex.20 | Ex.21 | Ex.22 | Ex.23 | Ex.24 |
|---|---|---|---|---|---|---|---|
| Polyamide 1 | 35 | 35 | 60 | 55 | 45 | 55 | 55 |
| CTO-D | 30 | 30 | 5 | 10 | 20 | 10 | 10 |
| MxMG | 20 | | | | | | |
| MxEG | | 20 | | | | | |
| BTG | | | 20 | 20 | 20 | 20 | 15 |
| NaOH | 4 | 4 | 4 | 4 | 4 | 4 | 4 |
| Water | 11 | 11 | 11 | 11 | 11 | 11 | 16 |
| Soluble | Yes | Yes | Yes | Yes | Yes | Yes | Yes |
| Viscosity mPa · s | ND | ND | 1960 | ND | 1400 | ND | ND |
| Pour Point ° C. | ND | ND | −4 | ND | −10 | ND | ND |

ND = Not Determined

TABLE 4

|  | Ex.25 | Ex.26 | Ex.27 | Ex.28* | Ex.29 | Ex.30 |
|---|---|---|---|---|---|---|
| Polyamide 1 | 55 | 55 | 55 | 55 | 55 | 55 |
| CTO-D | 10 | 10 | 10 | 10 | 10 | 10 |
| FAA | | | | — | | |
| FA | | | | | | |
| BTG Bottoms | 10 | 5 | | | | |
| Escaid 117 | | | 20 | | | |
| Glycol Ether EB | | | | | 20 | |
| Glycol Ether DB | | | | | | 20 |
| NaOH | 4 | 4 | 4 | 4 | 4 | 4 |
| Water | 21 | 26 | 31 | 11 | 11 | 11 |
| Soluble | Yes | Yes | Yes | No | Yes | Yes |
| Viscosity mPa · s | 1400 | 2460 | ND | ND | ND | ND |
| Pour Point ° C. | 6 | 6 | ND | ND | ND | ND |

*Comparative
ND = Not Determined

The emulsion stabilizing agents of the invention are homogeneous liquid at room temperature and show a viscosity which allows an easy on-field manageability.

Performance Test

The emulsifying performances of the emulsion stabilizing agent of Examples 14 were evaluated on exemplary drilling fluids.

350 ml of drilling muds were prepared by means of a Hamilton Beach Mixer according to the formulations described in Table 5.

A commercial emulsifier was used to prepare two comparative muds (MUD 1-2).

For the preparation of the muds, the following commercial products were used:

EMULAM V-PLUS, organobentonite, commercialized by Lamberti USA;

EMULAM PE, emulsifier, commercialized by Lamberti USA.

TABLE 5

|  |  | MUD 1* | MUD 2* | MUD 3 | MUD 4 |
|---|---|---|---|---|---|
| Diesel | ml/l | 624 | 624 | 624 | 624 |
| Emulam V-Plus | g/kg | 17 | 17 | 17 | 17 |
| Lime | g/kg | 14 | 14 | 14 | 14 |
| EMULAM PE | ml/l | 28 | 28 | — | — |
| Example 14 | ml/l | — | — | 28 | 28 |
| Water | ml/l | 110 | 110 | 110 | 110 |
| CaCl$_2$ | g/kg | 36 | 36 | 36 | 36 |
| Gilsonite | g/kg | 14 | 14 | 14 | 14 |
| Barite | g/kg | 777 | 777 | 777 | 777 |
| OCMA Clay | g/kg | — | 100 | — | 100 |

*Comparative

For the evaluation of the muds, the rheological properties, the electrical stability (ES) and the HTHP filtrate volume were determined after hot rolling for sixteen hours at 65° C. (150° F.) according to ISO 10416, par. 26.8. The determination conditions are described in ISO 10416 par 26.10. The results are reported in Table 6.

TABLE 6

|  |  | MUD 1* | MUD 2* | MUD 3 | MUD 4 |
|---|---|---|---|---|---|
| Rheology | lb/100 ft$^2$** | 39 | 60 | 43 | 57 |
| 600 rpm | | | | | |
| 300 rpm | lb/100 ft$^2$** | 21 | 31 | 25 | 32 |
| 200 rpm | lb/100 ft$^2$** | 14 | 21 | 17 | 24 |
| 100 rpm | lb/100 ft$^2$** | 8 | 13 | 11 | 14 |
| 6 rpm | lb/100 ft$^2$** | 2 | 4 | 3 | 3 |
| 3 rpm | lb/100 ft$^2$** | 2 | 3 | 2 | 2 |
| 10 sec | lb/100 ft$^2$** | 2 | 2 | 3 | 3 |
| 10 min | lb/100 ft$^2$** | 2 | 3 | 4 | 5 |
| PV | mPas | 18 | 29 | 18 | 25 |
| YP | lb/100 ft$^2$** | 3 | 2 | 7 | 7 |
| ES | volts | 282 | 452 | 287 | 476 |
| HTHP | ml | 6.6 | 8.0 | 4.0 | 5.0 |

*Comparative
**1 lb/100 ft$^2$ = 0.479 Pa

The muds prepared with the emulsion stabilizing agent of the invention showed good rheological characteristic, also after the thermal treatment, comparable with those of the emulsifiers of the prior art. Moreover they showed low fluid loss and no water separation in the HTHP filtrates. The good performances of the emulsifiers of the inventions were also demonstrated by the high electrical stability values.

The invention claimed is:

1. A hydrocarbon-free emulsion stabilizing agent comprising:
    a) from 20 to 65% by weight of a fatty polyamide and/or a fatty alkanolamide;
    b) from 5 to 40% by weight of another emulsifier selected among fatty acids, oxidized fatty acids, maleated fatty acids, polymerized fatty acids and mixtures thereof;
    c) from 5 to 35% by weight of water;
    d) from 0 to 25% by weight of a mutual solvent; with the proviso that the pH of emulsion stabilizing agent is comprised between 8 and 12, wherein the hydrocarbon-free emulsion stabilizing agent comprises no hydrocarbon solvent.

2. The emulsion stabilizing agent of claim 1 comprising: a) from 35 to 55% by weight of a fatty polyamide and/or a fatty alkanolamide; b) from 10 to 25% by weight, of another emulsifier selected among fatty acids, oxidized fatty acids, maleated fatty acids, polymerized fatty acids and mixtures thereof; c) from 5 to 35% by weight of water; d) from 10 to 25% by weight of a mutual solvent.

3. The emulsion stabilizing agent of claim 1, wherein the emulsifier b) is selected among fatty acids.

4. The emulsion stabilizing agent of claim 1, wherein the mutual solvent is selected from the group which consisting of $C_1$-$C_6$ alcohols, glycols, polyglycols, glycol ethers, and mixtures thereof.

5. A water-in-oil subterranean treatment fluid comprising: an aqueous phase, an oil phase and the hydrocarbon-free emulsion stabilizing agent of claim 1.

6. The subterranean treatment fluid of claim 5, comprising: an aqueous phase, an oil phase and from 0.5 to 5.0% weight/volume of said emulsion stabilizing agent.

7. A hydrocarbon-free emulsion stabilizing agent comprising:
    a) from 20 to 65% by weight of a fatty polyamide and/or a fatty alkanolamide;

b) from 5 to 40% by weight of another emulsifier selected among fatty acids, oxidized fatty acids, maleated fatty acids, polymerized fatty acids and mixtures thereof;
c) from 5 to 35% by weight of water;
d) from 0 to 25% by weight of a mutual solvent with the proviso that the pH of emulsion stabilizing agent is comprised between 8 and 12
wherein the fatty polyamide a) is prepared by reaction of:
i) one mole of polyamine having n amino groups with exchangeable hydrogens, wherein n is an integer ranging from 2 to 6;
ii) from 1 to n-1 moles of a saturated or unsaturated $C_6$-$C_{30}$ aliphatic monocarboxylic acid; and, subsequently, reacting the remaining amino groups with exchangeable hydrogens of the partial amide with:
iii) at least 0.3 moles of a $C_2$-$C_{10}$ di- and/or tri-carboxylic acid or the corresponding anhydride.

8. The emulsion stabilizing agent of claim 7, wherein the remaining amino groups with exchangeable hydrogens are reacted with from 0.4 to 1 mole of $C_2$-$C_{10}$ dicarboxylic acid for each remaining amino group.

9. A hydrocarbon-free emulsion stabilizing agent comprising:
a) from 20 to 65% by weight of a fatty polyamide and/or a fatty alkanolamide;
b) from 5 to 40% by weight of another emulsifier selected among fatty acids, oxidized fatty acids, maleated fatty acids, polymerized fatty acids and mixtures thereof;
c) from 5 to 35% by weight of water;
d) from 0 to 25% by weight of a mutual solvent; with the proviso that the pH of emulsion stabilizing agent is comprised between 8 and 12, wherein the hydrocarbon-free emulsion stabilizing agent comprises no mineral oil, diesel oil, crude oil or kerosene.

10. The hydrocarbon-free emulsion stabilizing agent of claim 9 wherein the mutual solvent is $C_1$-$C_6$ alcohol, 2-[propanol, methanol, n-butanol, glycol, polyglycol, glycol ether, ethyl lactate, propylene carbonate, butylene carbonate, water-oil-soluble ketone, water-oil-soluble acetal, water-oil-soluble ketal, water-oil-soluble pyrrolidone, and/or mixtures thereof.

* * * * *